United States Patent Office 3,783,142
Patented Jan. 1, 1974

3,783,142
PROCESS FOR THE PREPARATION OF
O-AMINOBENZONITRILE
Jan Magnus Bakke, Trondheim, Norway, and Harald Erik Heikmann, Karlskoga, Sweden, assignors to Aktiebolaget Bofors, Bofors, Sweden
No Drawing. Filed May 19, 1971, Ser. No. 145,059
Claims priority, application Sweden, June 1, 1970, 7,549/70
Int. Cl. C07c 121/02
U.S. Cl. 260—465 E
2 Claims

ABSTRACT OF THE DISCLOSURE o-Aminobenzonitrile is obtained from o-nitrotoluene by heating the latter with ammonia at about 350–550° C. in the presence of a dehydration catalyst.

---

The present invention relates to a process for the preparation of o-aminobenzonitrile. This compound is valuable as a starting material for chemical syntheses. Thus it may be hydrolyzed to o-aminobenzamide and to anthranilic acid which both are important starting materials in the chemical industry. Moreover it may be catalytically reduced to the corresponding benzylamine.

o-Aminobenzonitrile has previously been very hard to obtain as it had to be prepared from o-nitrobenzamide by dehydration and thereafter reduction of the nitro group according to the following reaction formulae:

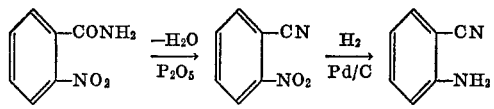

According to the present invention it has now been possible to prepare o-aminobenzonitrile in a simple and economically satisfactory manner by contacting o-nitrotoluene and ammonia over a heated dehydration catalyst, such as silica gel, alumina, a molecular sieve type such as a synthetic zeolite, silica gel-alumina, zinc oxide, tungsten oxide etc. The reaction temperature may be between 350 and 550° C. The molecular ratio o-nitrotoluene:ammonia is suitably maintained between 1:2 and 1:100.

The process according to the present invention may be illustrated by the following reaction formulae:

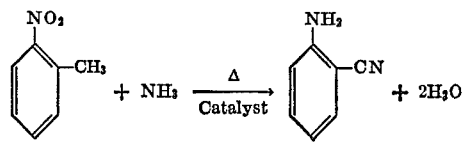

The invention will be further illustrated in the following concrete working examples.

Example 1

Vaporized o-nitrotoluene (ONT) and gaseous ammonia were mixed in a molecular ratio ($NH_3$:ONT) of 28:1 and this mixture was at atmospheric pressure passed through a quartz pipe heated to 450° C., said pipe being filled to 2/3 with silica gel and to 1/3 with crushed quartz so that the vapors being formed by the heating first came into contact with the quartz and then with the silica gel. The nominal reaction time over the catalyst was 5.7 seconds. The resulting reaction mixture was thereafter cooled and an analysis of the condensate by means of gas chromatography proved that the condensate contained ONT (7% by weight of the amount charged) and o-aminobenzonitrile (25% by weight of the reacted ONT). o-Aminobenzonitrile was obtained from the reaction mixture by means of column chromatography on silica gel with chloroform as the eluating agent and it was also identified by means of the I.R.- and U.V.-spectra and the melting point (48–49° C.).

Examples 2–6

These investigations were carried out analogously with Example 1 but the reaction conditions were varied as shown in the following table which also shows the results obtained.

| Example | Catalyst | Reaction temperature, ° C. | Mole $NH_3$/ mole ONT | Reaction time, seconds | Percent reacted ONT | Yield of aminobenzonitrile in percent of reacted ONT |
|---|---|---|---|---|---|---|
| 2 | Silica gel | 550 | 28/1 | 6.3 | 100 | 29 |
| 3 | do | 400 | 27/1 | 5.3 | 40 | 34 |
| 4 | do | 400 | 28/1 | 2.9 | 30 | 36 |
| 5 | Molecular sieve 13 X [1] | 550 | 27/1 | 5.3 | 100 | 8 |
| 6 | $Al_2O_3$ | 350 | 22/1 | 5.3 | 72 | 13 |

[1] The molecular sieve is a synthetic zeolite of the type crystalline sodium-aluminum-silicate with an effective porous diameter of 10 A. (Union Carbide Molecular Sieve Type 13 X).

What is claimed is:
1. A process for preparing o-aminobenzonitrile from o-nitrotoluene which consists in contacting o-nitrotoluene and ammonia at atmospheric pressure in a molar ratio of about 1:2 to about 1:100 at a temperature of about 350 to 550° C. in the presence of a catalyst selected from the group consisting of silica gel, alumina, and a synthetic zeolite molecular sieve.
2. A process according to claim 1 wherein the synthetic zeolite is a crystalline sodium aluminum silicate.

References Cited

UNITED STATES PATENTS

| 2,450,632 | 10/1948 | Caldwell, Jr. et al. | 260—465 C |
| 2,450,677 | 10/1948 | Marisic et al. | 260—465 C |
| 2,736,739 | 2/1956 | England et al. | 260—465 C |
| 3,231,600 | 1/1966 | Jones et al. | 260—465 C |

OTHER REFERENCES

Watanabe, C.A., vol. 51 (1957), p. 17815d-e.

JOSEPH P. BRUST, Primary Examiner

U.S. Cl. X.R.

260—465 C